Jan. 15, 1963  W. S. RICHARDSON  3,073,175
REVERSIBE POWER TRANSMISSION
Filed March 28, 1961
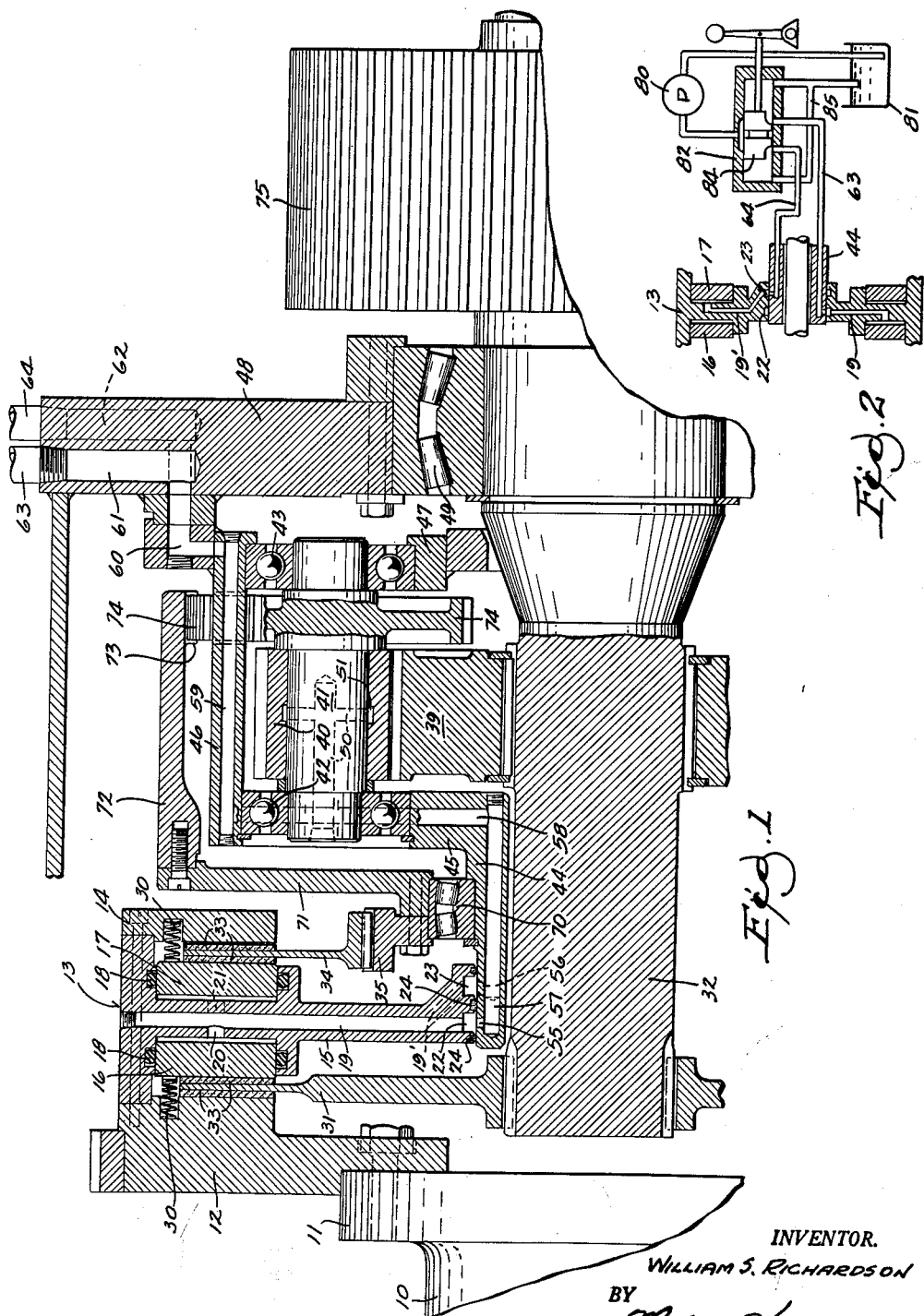
INVENTOR.
WILLIAM S. RICHARDSON
BY
*Miles Henninger*
ATTORNEY 3,073,175
REVERSIBLE POWER TRANSMISSION
William S. Richardson, Milwaukee, Wis., assignor to The Falk Corporation, Milwaukee, Wis., a corporation of Wisconsin
Filed Mar. 28, 1961, Ser. No. 98,846
6 Claims. (Cl. 74—377)

This invention relates to a reversing gear set, especially adapted for marine use.

The device of my invention generally comprises a marine reversing gear set in which the output shaft is driven in either direction, from a unidirectional drive such as a flywheel of an internal combustion engine, through two selectively operable disk clutches. One disk clutch locks the engine to the output shaft for direct drive by and with the flywheel and a separate disk clutch locks the engine to the output shaft through a gear set for rotation in reverse, the speed of the shaft being reduced somewhat by the gear set. The invention comprises unique means for supporting the input member of the reversing reduction gear set, which is mounted on a self-aligning bearing at one end and in tooth engagement with the idler pinions of the reversing reduction gear set at the other end, to equalize load division between the gears and to minimize the effect of dimensional errors, due to unavoidable inaccuracies in machining and other production methods. The invention also comprises unique structure of the idler and pinion housing, which is secured to the main reduction gear housing to support the input reversing gear member and to provide a non-rotating fluid conduit means for the hydraulic clutch control mechanism which is mounted on the flywheel of the engine. The arrangement features a simplified assembly by the elimination of costly clutch bearings and fluid passages having relatively rotating parts which are normally required to afford communication between an appropriate pressure source and the clutches and which become very troublesome.

In the drawing:

FIG. 1 is a radial cross-sectional view through the clutch and reversing gear set of my invention; and FIG. 2 is a schematic diagram of a hydraulic clutch control system for the gear set.

The drawing shows an input shaft 10 driven from an internal combustion engine (not shown) and having a flange 11 which is connected with flywheel 12. A cylindrical member 13 and an annular end wall member 14 are mounted on the flywheel and cooperate therewith in forming a portion of a multi-plate disk clutch. An annular clutch portion 15 extending inwardly from clutch housing member 13, forms chambers for two annular pistons 16, 17 sealed in their chambers by resilient O-rings 18 and selectively movable by fluid pressure acting through passage 19 (and passage 19' of FIG. 2) and ports 20 or 21 against one side of the several pistons. Clutch member 15 is enlarged at its inner periphery to provide grooves 22 and 23 which are sealed against another member (to be described) by resilient seals 24. The pistons 16, 17 are urged into their respective chambers by helical compression springs 30 which are seated in sockets arranged in a circle about the flywheel 12 and about the clutch end wall 14. Hence pistons 16, 17 are under the action of oil pressure for movement in one direction and under the action of the springs 30 for movement in another direction.

A movable clutch disk 31 is splined on a driven shaft 32 and extends between a surface of the flywheel 12 and of piston 16 and carries friction facings 33 engageable with such surfaces. Another movable clutch disk 34 is splined on a ring 35 forming a portion of a gear set (to be described) and extends between a surface of the clutch end wall 14 and piston 17 and also has friction facings 33 engaging with such surfaces. The splines permit free axial movement of the disks and centralizing of the disks between the surfaces engaged thereby. Such freedom of movement compensates for differences in manufacturing tolerances and differences due to unequal heating of parts and to the wear of parts. Further, the clutch disks are isolated from the aligning actions of other parts which are described below.

Driven shaft 32 has keyed thereto a spur gear 39 meshing with a number of pinion gears 40 severally mounted on shafts 41 which are mounted in ball bearings 42, 43 in a cage around the sun gear 39. The pinion cage comprises a flange or sleeve member 44 extending coaxially with the shaft 32 and a wall 45 extending at right angles to the shaft. A peripheral member 46 extends from the end wall 45 to an end wall 47 and is connected with a main housing portion 48 in which is mounted a beveled tapered roller bearing 49 for the shaft 32. Pinions 40 are preferably shrunk on their respective shafts 41 and it is difficult to attain good initial tooth contacts of the pinions with the sun gear 39. Hence shafts 41 are formed with bores 50 connecting with a groove 51 in the pinion. Fluid pressure is now applied to the bores and grooves at a value somewhat greater than specific pressure between the engaged shaft and the pinion surfaces. The fluid separates the pinion and shaft sufficiently for the pinion to rotate on the shaft into tooth contact. Cessation of the fluid pressure then allows direct contact of the pinions on the shafts so that torque is transmitted by the shaft.

The cage walls and housing walls above identified are formed with passages for the flow of oil to and from the clutch pistons 16, 17. Grooves 22 and 23 in clutch part 15 are severally connected with ports 55 and 56 which severally lead to two passages in the cage sleeve 44, only one such passage 57 being shown completely. Passage 57 is connected with passages 58, 59, 60 and 61 extending through the pinion cage and into the main housing member 48, the second oil passage being indicated at 62 in the member 48 and shown in FIG. 2. The grooves 22 and 23 forming a part of the oil passages are constantly in communication with their respective ports 55 and 56 so that the pressure is not interrupted regardless of the rotation or position of the ports. The passage portions 61 and 62 are severally connected with pipes 63 and 64 to a source of fluid pressure and valving for controlling transmission of the pressure.

The flange 44 of the pinion cage 44—47 supports a bearing 70 on which is mounted the ring 35 to which the clutch disk 34 is splined. An annular member 71 is connected with the ring 35 and is also mounted on the bearing 70 and extends radially outward of the pinion cage 44—47. A cylindrical member 72 extends from the radial member 71 and has an internal gear 73 held in or fixed to the interior of cylinder 72 to form a ring gear meshing with idler gears 74 severally mounted on the pinion shafts 41.

Shaft 32 supported in part by roller bearings 49 extends beyond main housing member 48 to carry a gear 75 which may be part of another reduction gear set. Clutch disk 31 may connect the flywheel 12 directly to the shaft 32 for rotation thereof in the same direction as shaft 10 while clutch disk 34 may connect the flywheel 12 to the reversing gearing 39, 40, 73 and 74 whereby the direction of rotation of shaft 32 is reversed. When clutch disk 31 is engaged, power flows directly from shaft 10 and flywheel 12 to shaft 32 and gear 75 and all other parts are idle. When clutch disk 34 is engaged power flows by way of ring 35 and housing walls 71 and 72, ring gear 73, idlers 74, pinions 40 and sun gear 39 to the shaft 32. The idler gears are the only support for the ring gear 73 and the end of shaft 32 to the left from bearing 49, and the ring gear is so mounted that it may move freely radially to adjust to the idler gears, by self alignment of the bearing 70. Fluid pressure is supplied by way of pipes 63 or 64 and the passages 61—ports 20 or 62—port 21 to act respectively on pistons 16 and 17. For example, liquid pressure acts through passages 61, 60, 59, 58, 57, port 22, passage 19 and port 20 on the back of piston 16.

Pistons 16 and 17 may not be put under fluid pressures simultaneously, because the clutch disks associated respectively therewith rotate at different speeds and in opposite directions. Hence each piston is connected with its own passage for supply and discharge of oil pressure to the piston. Each of such passages has only a single rotating joint in the present construction. Referring to FIG. 2, the fluid passages to and from pistons 16 and 17 are actually separated by 180° in the housing part 15 rather than being immediately adjacent to one another as indicated in FIG. 1, for convenience in illustration, but the actual angular distance between the passageways is not important. A pump 80 draws fluid from a sump 81 to supply the fluid under pressure to a valve 82. No fluid is transmitted in the neutral position of the valve 82 and a bypass to the sump may be provided which is opened when the valve is in neutral position. When valve piston 84 is moved toward the right in FIG. 2, fluid under pressure is supplied to conduit 63 and the passages 61—19 shown in FIG. 1, and through port 20 to apply fluid pressure to the rear of piston 16. If the valve 84 is moved to the left, pressure is applied to the conduit 64 and the passages 62—19' associated therewith, through port 21 and to the rear face of piston 17 while conduit 63 and piston 16 are then connected to the return line. The above control system is illustrated only as an example, there being numerous ways to provide for control of the system.

The clutch disks are splined to the members driven thereby so that the disks are easily centered and no clutch bearings are required. The clutch disks are isolated from any aligning actions of other parts and the disk movements are not affected by such parts. The input ring gear is supported at one end by a self-aligning bearing and at the other end by meshing with the idler pinions of a reversing speed reduction gear set. Thus the load is equalized between the gears and the effect of dimensional errors is minimized. The cage for the pairs of pinions is secured to the main reduction gear housing to support and hold the cage immovable and such housing and cage provide fluid conduits with the minimum of relatively movable joints for transmission of fluid pressure to the pistons for selectively operating disk clutches.

I claim:

1. In a reversible power transmission, a driving shaft, a driven shaft, a stationary main housing rotatably supporting the driven shaft, a reversing gear set connected with the driven shaft, a plurality of selectively operable clutches, one of the clutches connecting the driving shaft directly with the driven shaft and another of the clutches connecting the two shafts through the reversing gear set, the reversing gear set comprising a sun gear mounted on the driven shaft, a cage mounted on the main housing and rotatably supporting a series of shafts each having a pair of pinions fixed thereon and a ring gear connected with one member of one of the clutches and meshing with one pinion of each pair, the other pinion of each pair meshing with the sun gear.

2. In a reversible power transmission, a driving shaft, a driven shaft, a stationary main housing, a reversing gear set connected with the driven shaft, and a plurality of clutches selectively operable by fluid pressure, one of the clutches connecting the driving shaft directly with the driven shaft and another of the clutches connecting the two shafts through the reversing gear set, one clutch member providing passages for delivery of fluid pressure to the clutches, the reversing gear set comprising a sun gear mounted on the driven shaft, a cage mounted on the main housing, pinions rotatably supported in the cage, a number of the pinions meshing with the sun gear, and a ring gear connected with one member of one of the clutches and meshing with a number of the pinions, the main housing and the cage providing passages free from relatively movable joints for delivery of fluid pressure to the clutches.

3. In a reversible power transmission, a driving shaft, a driven shaft, a stationary main housing, a reversing gear set connected with the driven shaft, and a plurality of disk clutches engageable with the driven shaft and comprising pistons movable axially of the shaft in one direction by fluid pressure for respectively connecting the driving shaft directly with the driven shaft and connecting another of the clutches with the two shafts through the reversing gear, one clutch member providing passages for fluid pressure flow separately to the clutch pistons, the reversing gear set comprising a sun gear mounted on the driven shaft, a cage mounted on the main housing, plural sets of pinions rotatably mounted in the cage and a ring gear connected with one member of one of the clutches and meshing with a number of the pinions, the main housing and the cage and the said clutch member providing separate passages each having a single relatively movable joint with the respective clutch member passages.

4. In a reversible power transmission, a driving shaft, a driven shaft, a stationary main housing, a reversing gear set connected with the driven shaft, and a plurality of disk clutches selectively engageable with the driven shaft, one of the clutch disks being splined to the driven shaft for direct delivery thereto of power from the driving shaft, the reversing gear set comprising a sun gear fixed on the driven shaft, a cage fixed on the main housing, plural pinion shafts rotatably supported in the cage, a pair of pinion gears fixed on each of the pinion shafts and a movable ring gear meshing with one pinion gear on each pair of gears, the ring gear being rotatably mounted on the reversing gear cage and engaged with one member of one of the disk clutches for rotation thereby.

5. In a reversible power transmission, a driving shaft, a driven shaft, a stationary main housing, a reversing gear set connected with the driven shaft, and a plurality of disk clutches selectively engageable with the driven shaft, one of the clutch disks being splined to the driven shaft for direct delivery thereto of power from the driving shaft, the reversing gear set comprising a sun gear fixed on the driven shaft, a cage fixed on the main housing, plural pinion shafts rotatably supported in the cage, a pair of pinion gears fixed on each of the pinion shafts and a movable ring gear meshing with one pinion gear of each pair of gears, a self-aligning bearing mounted on the reversing gear cage, the ring gear being supported on the bearing and being splined to one of the clutch disks for rotation thereby, the splined connections of the clutch disks providing centering movement thereof relative to the clutch surfaces rotated by the driven shaft.

6. In a reversible power transmission, a driving shaft, a driven shaft, a stationary main housing, a reversing gear set connected with the driven shaft, and a plurality of disk clutches selectively engageable with the driven shaft, one of the clutch disks being splined to the driven shaft for direct delivery thereto of power from the driving shaft, the reversing gear set comprising a sun gear fixed on the driven shaft, a cage fixed on the main housing, plural pinion shafts rotatably supported in the cage, pinion gears fixed on each of the pinion shafts and meshing in part with the sun gear and a movable ring gear meshing some of the pinion gears, a self-aligning bearing mounted on the reversing gear cage, the reversing ring gear being supported on the bearing and being splined to one of the clutch disks for rotation thereby, the bearing and the pinions meshing with the ring gear being the only support for the ring gear.

References Cited in the file of this patent

UNITED STATES PATENTS

| | | |
|---|---|---|
| 1,722,839 | Coleman | July 30, 1929 |
| 2,718,017 | Anderson et al. | Sept. 20, 1955 |